(12) United States Patent
Paad

(10) Patent No.: US 11,964,637 B2
(45) Date of Patent: Apr. 23, 2024

(54) TIRE CLEANING MECHANISM FOR WHEELCHAIR AND METHODS OF USE

(71) Applicant: Eric Paad, Rapid River, MI (US)

(72) Inventor: Eric Paad, Rapid River, MI (US)

( * ) Notice: Subject to any disclaimer, the term of this patent is extended or adjusted under 35 U.S.C. 154(b) by 545 days.

(21) Appl. No.: 17/192,427

(22) Filed: Mar. 4, 2021

(65) Prior Publication Data

US 2021/0291794 A1 Sep. 23, 2021

Related U.S. Application Data

(60) Provisional application No. 62/991,474, filed on Mar. 18, 2020.

(51) Int. Cl.
*B60S 1/68* (2006.01)
*A61G 5/10* (2006.01)

(52) U.S. Cl.
CPC .............. *B60S 1/68* (2013.01); *A61G 5/1054* (2016.11); *B60S 1/685* (2013.01)

(58) Field of Classification Search
CPC ... B60S 1/68; B60S 1/685; A61G 5/10; A61G 5/1054
See application file for complete search history.

(56) References Cited

U.S. PATENT DOCUMENTS

| | | | |
|---|---|---|---|
| 719,608 A | 2/1903 | Peterson | |
| 725,843 A | 4/1903 | Henn, Jr. | |
| 4,605,239 A | 8/1986 | Warfel | |
| 4,841,591 A | 6/1989 | Candow | |
| 5,430,906 A | 7/1995 | Drury | |
| 5,857,238 A | 1/1999 | Jmill | |
| 5,860,180 A | 1/1999 | Heise | |
| 6,434,781 B1 | 8/2002 | Guerra | |
| 6,776,698 B2 | 8/2004 | Pepin et al. | |
| 9,067,570 B2 | 6/2015 | Kueppers | |
| 9,346,438 B1 | 5/2016 | Parker, III | |
| 9,358,959 B2 | 6/2016 | Majka | |
| 9,718,448 B2 | 8/2017 | Tolbert | |
| 11,285,922 B1 * | 3/2022 | Tolbert | B60S 1/68 |
| 11,357,678 B1 * | 6/2022 | Tolbert | A46B 5/0095 |
| 2004/0016070 A1 | 1/2004 | Nemcek | |
| 2005/0015902 A1 | 1/2005 | Pulvermacher | |

(Continued)

FOREIGN PATENT DOCUMENTS

| | | |
|---|---|---|
| CN | 204564614 U | 8/2015 |
| CN | 108816872 A | 11/2018 |

(Continued)

*Primary Examiner* — Randall E Chin
(74) *Attorney, Agent, or Firm* — DEVICE PATENT LLC

(57) ABSTRACT

A tire cleaning mechanism for a wheelchair comprises a fixation portion, a tire cleaner assembly, and an activation assembly. The fixation portion is operable to fixate the tire cleaner assembly to a wheelchair frame. The tire cleaner assembly is operable to remove debris from a wheelchair tire and the activation assembly is operable to move the tire cleaner assembly between an engaged configuration whereby a portion of the tire cleaner assembly engages a wheelchair tire and a disengaged configuration whereby the tire cleaner assembly is substantially removed from the wheelchair tire. A first link is coupled between at least one of a fixation portion and the tire cleaner assembly, or between the activation assembly and the tire cleaner assembly.

20 Claims, 9 Drawing Sheets

(56) References Cited

U.S. PATENT DOCUMENTS

| | | |
|---|---|---|
| 2008/0258451 A1 | 10/2008 | Thygesen |
| 2014/0284911 A1 | 9/2014 | Kueppers |
| 2017/0203735 A1 | 7/2017 | Tolbert |

FOREIGN PATENT DOCUMENTS

| | | |
|---|---|---|
| CN | 212190193 U | 12/2020 |
| DE | 202015000674 U1 | 4/2015 |
| DK | 179322 B1 | 4/2018 |
| FR | 3060960 B1 | 7/2019 |
| JP | H06154714 A | 6/1994 |
| JP | H08308879 A | 11/1996 |
| JP | H0910262 A | 1/1997 |
| JP | 3048370 U | 5/1998 |
| JP | H10337542 A | 12/1998 |
| JP | 2000166973 A | 6/2000 |
| JP | 2001106035 A | 4/2001 |
| JP | 2001106036 A | 4/2001 |
| JP | 2001122086 A | 5/2001 |
| JP | 3088103 U | 8/2002 |
| JP | 2002308066 A | 10/2002 |
| JP | 2003088818 A | 3/2003 |
| JP | 2003164491 A | 6/2003 |
| JP | 2003164814 A | 6/2003 |
| JP | 2003319974 A | 11/2003 |
| JP | 2004017733 A | 1/2004 |
| JP | 2004329842 A | 11/2004 |
| JP | 2008013049 A | 1/2008 |
| JP | 2010057625 A | 3/2010 |
| JP | 2012071667 A | 4/2012 |
| JP | 2013001380 A | 1/2013 |
| JP | 2013158519 A | 8/2013 |
| JP | 2015083107 A | 4/2015 |
| JP | 3200254 U | 10/2015 |
| JP | 6082349 B2 | 2/2017 |
| JP | 2017038863 A | 2/2017 |
| KR | 20110087852 A | 8/2011 |
| KR | 101105686 B1 | 1/2012 |
| KR | 20120100150 A | 9/2012 |
| KR | 101427402 B1 | 8/2014 |
| KR | 101434893 B1 | 8/2014 |
| NL | 1019720 C1 | 1/2002 |
| TW | M580464 U | 7/2019 |

* cited by examiner

TIRE CLEANING MECHANISM FOR WHEELCHAIR AND METHODS OF USE

This application claims priority to U.S. Provisional Patent Application No. 62/991,474 filed Mar. 18, 2020, the entire disclosure of which is hereby incorporated by reference and relied upon.

BACKGROUND

Field of the Invention

The invention relates generally to accessories for wheelchairs, and more particularly to accessories for cleaning of wheelchair tires.

Wheelchairs are commonly used outside traveling over surfaces that are dirty or have loose dirt. Particularly in bad weather, the wheelchair tires will pick dirt and other debris. When it is time for the wheelchair user to travel indoor, this dirt and other debris is released over carpet and floors. This creates undesired work to clean up the mess for either the wheelchair user or their caregivers. In many cases, homeowners end up living with wheelchair tracks through their living space that cannot be removed without replacement of flooring. The prior art has attempted to address this problem predominantly by creating a floor supported solution where the wheelchair user drives onto the cleaning apparatus and activates some sort of controls. Unfortunately, these cleaning systems tend to be complex, expensive, and have a large footprint that makes them impractical for most homeowners, businesses, and other facilities. Other systems of the prior art are difficult to utilize due to the physical limitations of the wheelchair user or positioning of activation controls.

What is needed is a wheelchair tire cleaning apparatus that is easily adapted to a variety of wheelchairs, of reasonable cost to manufacture, easy to use by those who experience physical or mental impairments, and of low complexity. The cleaning apparatus must be convenient to activate and deactivate by wheelchair users who often have limited upper extremity control, mobility, and strength. The cleaning apparatus should not produce and drag on the wheelchair, especially those chairs that are propelled by the user.

SUMMARY

Disclosed herein are tire cleaning mechanisms for wheelchairs and their methods of use.

In one form, a wheelchair comprises a tire cleaner mechanism.

In one form, a tire cleaner mechanism comprises a fixation portion, an activation assembly, and a tire cleaner assembly.

In one form, the tire cleaning mechanism is applied to at least one tire of the wheelchair.

In one form, the tire cleaning mechanism is applied to at least two tires of the wheelchair.

In one form, the tire cleaning mechanism on one side is substantially a mirror image of the tire cleaning mechanism on an opposing side.

In one form, a tire cleaner mechanism comprises a fixation portion operable for mounting to a wheelchair frame.

In one form, the tire cleaning mechanism comprises an activation assembly.

In one form, a tire cleaning mechanism comprises a tire cleaner assembly.

In one form, the tire cleaner assembly comprises a cleaner housing and a cleaner body.

In one form, the tire cleaning mechanism is mounted to a first wheelchair frame.

In one form, the activation assembly is a hand operated mechanism for activating a tire cleaner assembly to engage against a wheelchair tire of a wheelchair in an engaged configuration or to be spaced from the wheelchair tire in a disengaged configuration.

In one form, the tire cleaner assembly is mounted to a second wheelchair frame portion of the wheelchair.

In one form, a tire cleaner assembly is supported entirely by a second wheelchair frame portion of a wheelchair.

In one form, a tire cleaner assembly is positioned just posterior of the back of a wheelchair seat (posterior to a vertical plane A extending through each wheel axle) and just below or overlapping the crest height of the superior end of the wheelchair wheel (horizontal plane extending through superior crest of each wheel.

In one form, an activation rod extends anteriorly near an arm rest of the wheelchair within reach of the user (anterior to a vertical plane A extending through each wheel axle).

In one form, the tire cleaner assembly has both a disengaged configuration and an engaged configuration. In an engaged configuration, bristles from a cleaner body engages a wheelchair tire for brushing off debris.

In one form, the cleaner body of the tire cleaner assembly is pivoted through hand activation of an activation assembly to be in frictional engagement with a wheelchair tire.

In one form, a tire cleaner assembly comprises a first frame clamp, a quick release block, a first link, a first pivot spacer, and a cleaner housing.

In one form, the first frame clamp comprises a medially placed first clamp body adjacent a laterally placed second clamp body.

In one form, extending substantially vertical through an anterior end of the first frame clamp is a first frame aperture defined by an opposing first clamp face and second clamp face.

In one form, extending between a first clamp body and second clamp body are one or more first fastening holes aligned with second fastening holes.

In one form, an activation post comprises a first leg having a length sufficient to support the first post fixation hole and second post fixation hole. Extending upwards from the first leg is a second leg having a laterally protruding nose.

In one form, on an anterior facing surface of the nose is a stop face, whereas on a posterior facing surface of nose is a spring face.

In one form, an activation bypass hole extends between spring face and stop face.

In one form, a quick release block comprises a quick release body that in this embodiment is substantially rectangular having an outer surface.

In one form, protruding from an anterior end of the quick release block is a mate boss that is sized and shaped for housing within a mate receiver of the first frame clamp.

In one form, recessed in an opposing end of the quick release block is link housing.

In one form, the link housing is sized and shaped for pivotably receiving an anterior end of a first link.

In one form, the first link includes a first pivot channel at an anterior end and a second pivot channel at the posterior end.

In one form, a cleaner housing comprises a housing body that is substantially in the form of a U-shaped tunnel.

In one form, the inside of the housing body is defined by an inner housing surface whereas the outside of the housing body is defined by an outer housing surface.

In one form, extending through the housing body between the outer housing surface and inner housing surface are a plurality of fixation apertures.

In one form, a cleaner housing is reinforced by a U-shaped first housing support and second housing support.

In one form, seated in the cleaner housing adjacent an inner housing surface is a cleaner body.

In one form, the cleaner body comprises an outer cleaner surface having a profile for seating in the housing body, and an inner cleaner surface having a profile to complement a wheelchair tire.

In one form, extending from the inner cleaner surface is a plurality of cleaner bristles distributed for tire contact when in the engaged configuration.

In one form, extending from the inner cleaner surface is a textile such as a cloth, or other material such as a sponge.

In one form, a release pin aperture and release pin hole are sized for releasable seating of an activation release pin therein.

In one form, an activation assembly controls a tire cleaner assembly engaging a wheelchair tire.

In one form, an activation assembly comprises an activation handle having a cantilevered handle body that is pivotably captured about a pivot pin within a clamp body.

In one form, a bias element in the form of a spring encircles an activation cable at a posterior end.

In one form, the clamp body is clamped on a first wheelchair frame within a second frame aperture.

In one form, an activation cable extends through an activation bypass hole of an activation post.

In one form, a bias element effectuates consequent upward movement of the tire cleaning assembly into the disengaged position when the activation handle is released.

In one form, the bias element is compressed when the activation handle is depressed causing consequent engagement of the cleaner bristles against the wheelchair tire thereby brushing off dirt and debris when the wheelchair is moved forward.

In one form, removal of the tire cleaner assembly is accomplished by removing an activation release pin to disassociate the end capture. A cleaner removal pin is also removed thereby causing consequent freeing of the tire cleaner assembly for removal. By reversing these steps, the tire cleaner assembly can be reassembled.

In one form, a fixation portion of a tire cleaning mechanism comprises a first frame clamp spaced from a mid-rod clamp which in turn is spaced from a terminal rod clamp.

In one form, the first frame clamp comprises a first clamp body and an opposed second clamp body.

In one form, the first clamp body has a first clamp face, whereas the second clamp body has a second clamp face.

In one form, the first clamp body and second clamp body are held together by a first fixator and a second fixator whereas in some forms the first fixator and second fixator are threaded fasteners.

In one form, the first clamp face and second clamp face define a first clamp aperture operable for clamping over a portion of a wheelchair frame.

In one form, extending substantially perpendicular from the first frame aperture is a pair of first mate channels.

In one form, a pair of first fastening holes extend through the first clamp body and second clamp body and are occupied by fixators such as threaded fasteners.

In one form, an upper rod and a lower rod extend from the first frame clamp, through the mid-rod clamp, to the terminal rod clamp.

In one form, the upper rod and the lower rods have a proximal end and a distal end.

In one form, the upper rod and/or the lower rod have one or more radial indents operable for selective positional fixation within one or more of the first frame clamp, mid-rod clamp, and terminal rod clamp by a rod lock screw extending through the respective clamps.

In one form, the mid-rod clamp comprises a third clamp body and an opposed fourth clamp body.

In one form, an opposing third mate channel and fourth mate channel extends though the mid rod clamp for housing a portion of the upper rod and lower rod therein.

In one form, a third fixator clamps together the third clamp body and fourth clamp body.

In one form, a terminal rod clamp comprises a fifth clamp body mated to an opposed sixth clamp body.

In one form, an opposing fifth mate channel and sixth mate channel extends through the terminal rod clamp for housing a portion of the upper rod and lower rod.

In one form, one or more of a fourth fixator and fifth fixator clamps the fifth clamp body to the sixth clamp body.

In one form, the first frame clamp, the mid-rod clamp, and the terminal rod clamp can be adjustably clamped along the upper rod and lower rod as needed to facilitate correct positioning of the tire cleaner assembly on varying sizes and types of wheelchairs.

In one form, an activator housing extends from the mid-rod clamp.

In one form, the activator housing is fixated to the mid-rod clamp through one or more housing fasteners extending through housing fastener holes.

In one form, the activator housing comprises a guide aperture operable for housing an activation rod.

In one form, the guide aperture is substantially parallel to the upper rod and lower rod.

In one form, a first guide and a second guide in the form of bushings are seated in opposing sides of the guide aperture.

In one form, an activation rod comprises an enlarged activation handle mounted thereon and extending from an anterior end of the activation rod.

In one form, the activation rod comprises a plurality of rod teeth extending substantially linearly along the activation rod.

In one form, an activation rod comprises a posteriorly placed end capture operable for housing an activation pin within the end capture.

In one form, the activator housing comprises a spring pin recess extending through the activator housing and through the guide aperture and operable for seating a spring pin therein whereby the spring pin is in contact with the activation rod.

In one form, the spring pin abuts rod teeth extending from the activation rod.

In one form, the interaction between the spring pin and rod teeth cause a consequent position hold of the activation rod when forces on the activation rod are removed.

In one form, an activation handle is disposed on an anterior end of the activation rod for grasping by a wheelchair user or assistant to engage and disengage the tire cleaner assembly on the wheelchair tire.

In one form, a tire cleaner assembly comprises a cleaner housing formed from a housing body whereby the cleaner housing is operable to secure a cleaner body thereto.

In one form, the cleaner body comprises a plurality of bristles extending from one side and has a first cleaner end and opposed second cleaner end.

In one form, the cleaner body comprises a textile such as a cloth, or a sponge, or other material capable of wiping away debris from a tire.

In one form, an outer cleaner surface is fixed or releasably fixed to a downward facing or other inner housing surface of the housing body.

In one form, a fixation hole extends through the posterior end of the housing body which houses a second link fastener for fixation within the terminal rod clamp.

In one form, a first pivot spacer is utilized between the terminal rod clamp and cleaner housing body.

In one form, a first link is coupled at a second pivot channel to the end capture of the activation rod and coupled at a first pivot channel to the cleaner housing body.

In one form, an activation pin couples the end capture of the activation rod to the first pivot channel.

In one form, translation of the activation rod through movement of the first link, causes the cleaner body to engage or disengage a tire on a wheelchair.

In one form, the activation rod has an enlarged activation handle fixed at one end. In one form, a first link fastener couples a first link to the cleaner housing body.

BRIEF DESCRIPTION OF THE SEVERAL VIEWS OF THE DRAWINGS

These and other features and advantages of the present invention will become more readily appreciated when considered in connection with the following detailed description and appended drawings, wherein each drawing is according to one or more embodiments shown and described herein, and wherein.

DETAILED DESCRIPTION OF SELECTED EMBODIMENTS OF THE INVENTION

Select embodiments of the invention will now be described with reference to the Figures. Like numerals indicate like or corresponding elements throughout the several views and wherein various embodiments are separated by letters (i.e., 100, 100B, 100C). The terminology used in the description presented herein is not intended to be interpreted in any limited or restrictive way, simply because it is being utilized in conjunction with detailed description of certain specific embodiments of the invention. Furthermore, embodiments of the invention may include several novel features, no single one of which is solely responsible for its desirable attributes or which is essential to practicing the invention described herein.

Figure 1:
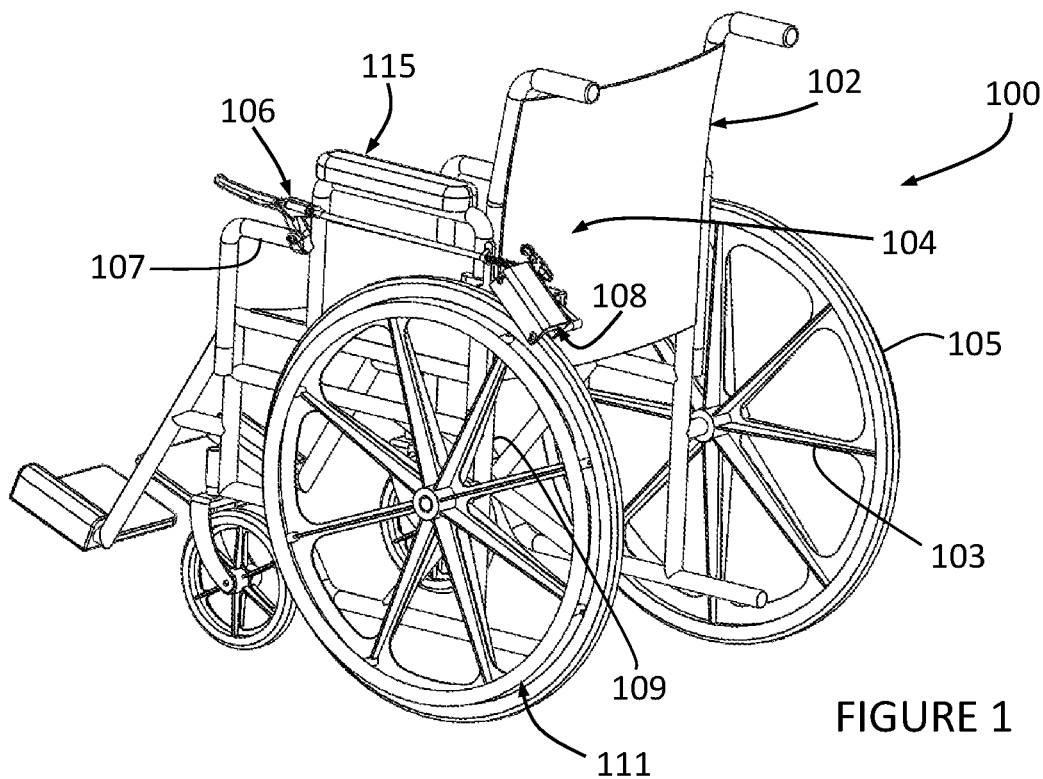
FIG. 1 depicts a posterior perspective view of a wheelchair with a tire cleaner mechanism.
Figure 2:
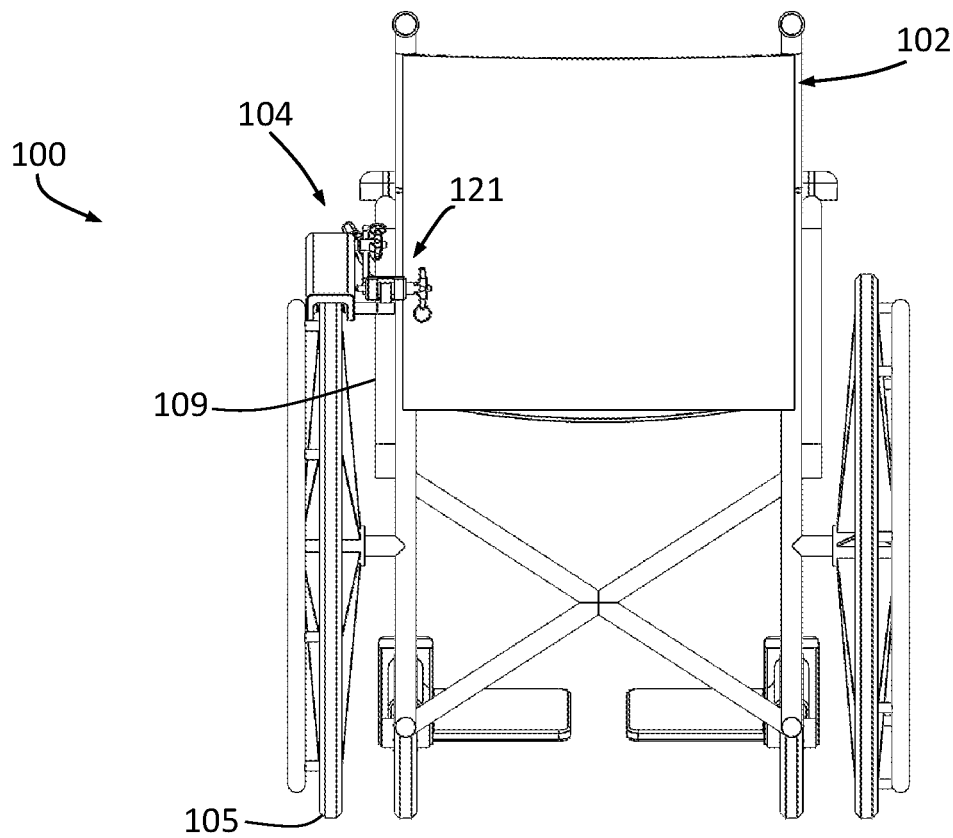
FIG. 2 depicts a posterior view of the wheelchair with a tire cleaner mechanism of FIG. 1.

FIG. 1 depicts a wheelchair with tire cleaner mechanism 100 according to one embodiment. In this embodiment the tire cleaning mechanism 104 is depicted on the left side of the wheelchair 102, however, as one skilled in the art would recognize, tire cleaner mechanism 100 can also be utilized on the opposing right side of the wheelchair 102 in a mirrored form on the right tire. The tire cleaning mechanism comprises an activation assembly 106 which activates and deactivates the device, a fixation portion 121 which secures the tire cleaning mechanism to a wheelchair frame, and a tire cleaner assembly 108 for cleaning the surface of a wheelchair tire. An activation assembly 106 is mounted to a first wheelchair frame 107 which in this embodiment is in the form of an anteriorly located tube near the armrest 115 of the wheelchair 102. The activation assembly 106 is a hand operated mechanism for activating a tire cleaner assembly 108 to engage against a wheelchair tire 105 of a wheelchair wheel 103. The tire cleaner assembly 108 is mounted to a second wheelchair frame 109 portion of the wheelchair 102 free from obstructing the propulsion ring 111 of the wheelchair wheel. In this case, the second wheelchair frame 109 portion is in the form of a substantially vertical support tube on the frame of the wheelchair located near the rear of the wheelchair's seat.

Figure 3:
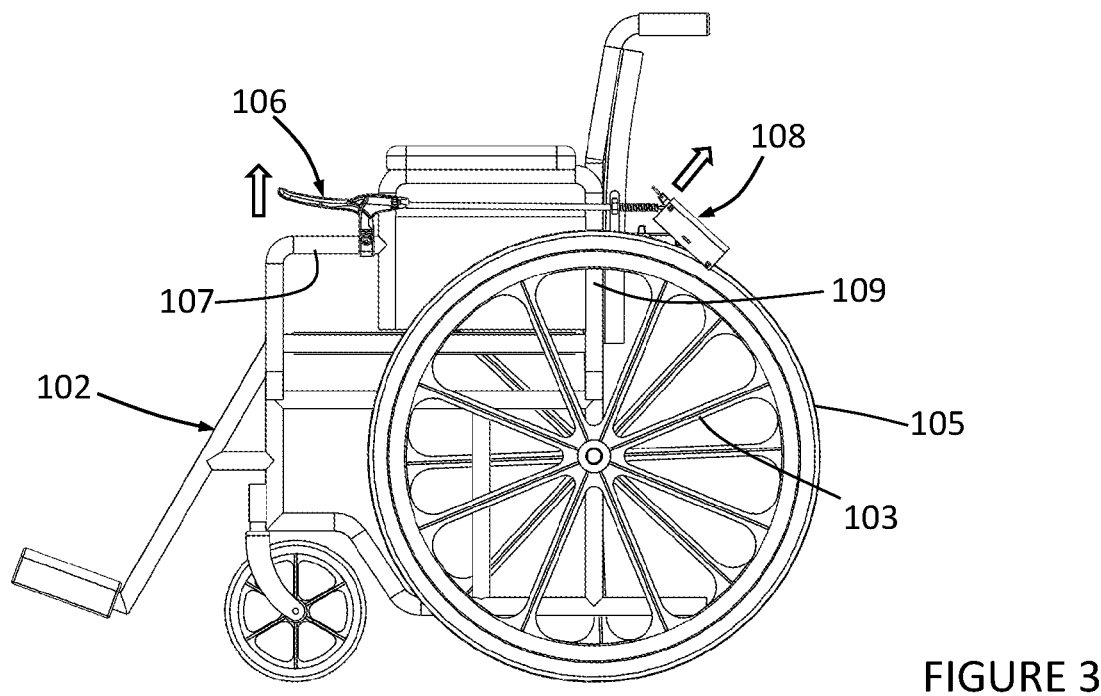
FIG. 3 depicts a side view of the wheelchair with a tire cleaner mechanism of FIG. 1 with tire cleaner disengaged.
Figure 4:
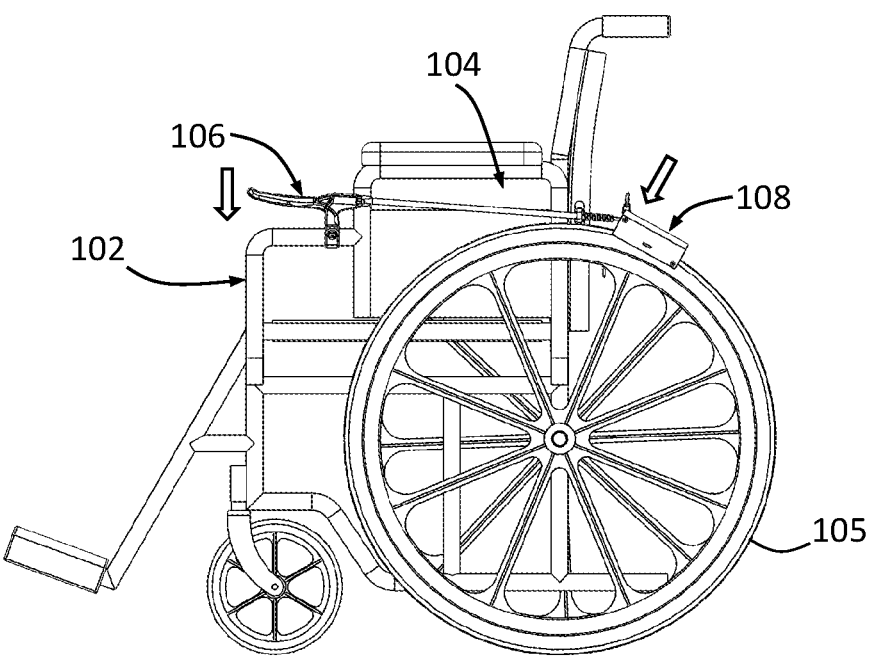
FIG. 4 depicts a side view of the wheelchair with a tire cleaner mechanism of FIG. 1 with tire cleaner engaged.
Figure 5:
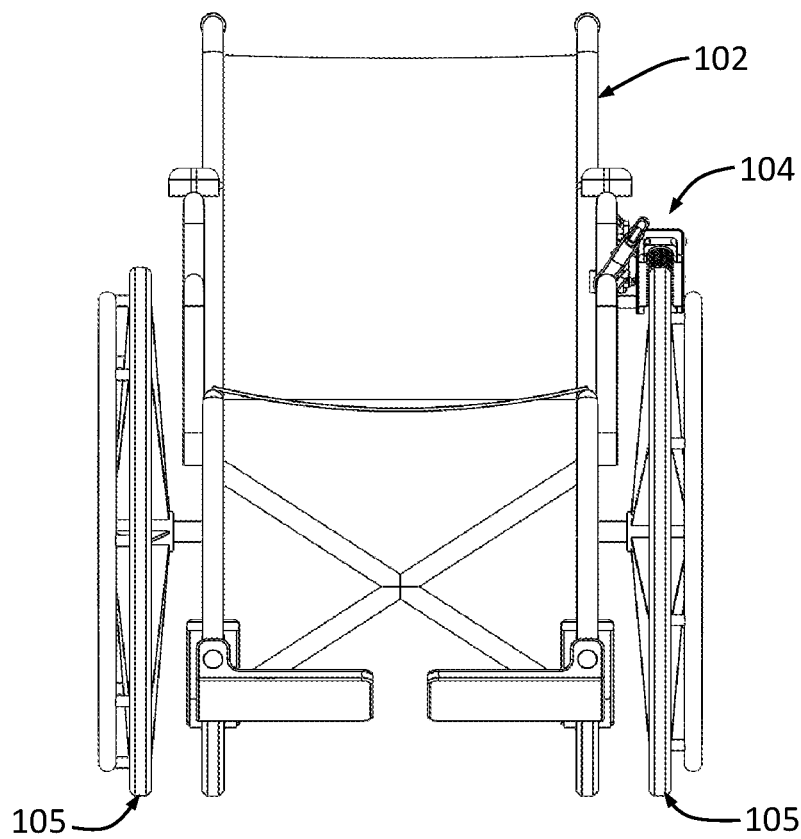
FIG. 5 depicts an anterior view of the wheelchair with a tire cleaner mechanism of FIG. 1.

FIGS. 2-5 provide additional views of the wheelchair with tire cleaner mechanism 100 from a posterior, side, and anterior views. FIG. 3 depicts the tire cleaner assembly 108 in a disengaged configuration whereby a cleaner body 214, here in the form of a brush (FIG. 11), is spaced from the wheelchair tire 105 providing friction free rotation of the wheelchair wheel 103. FIG. 4 depicts an engaged configuration whereby the cleaner body 214 of the tire cleaner assembly 108 is pivoted through hand activation of activation assembly 106 to be in frictional engagement with the wheelchair tire 105.

Figure 6:
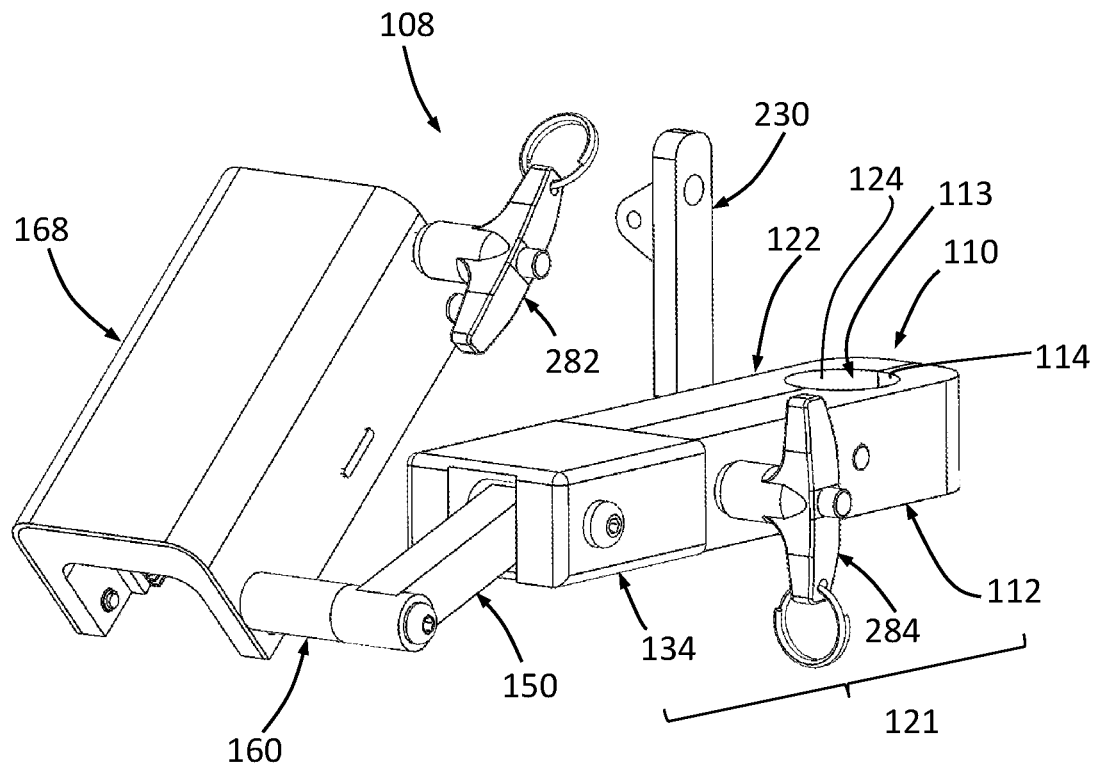
FIG. 6 depicts a posterior perspective view of a tire cleaner mechanism.
Figure 7:
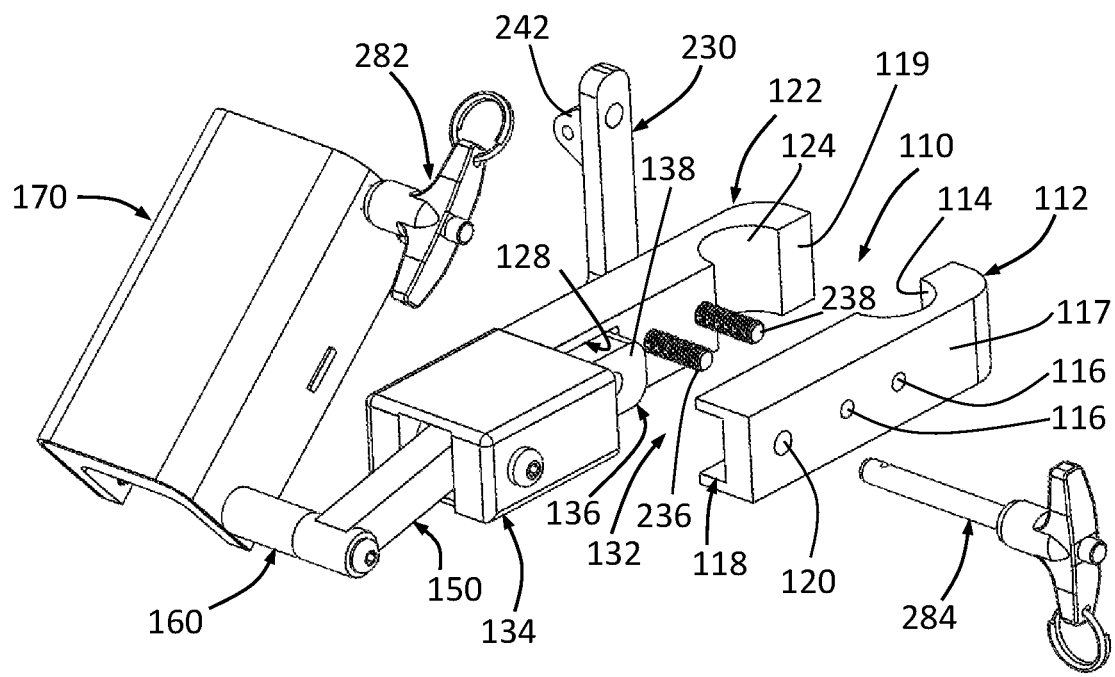
FIG. 7 depicts a partially exploded perspective view of a tire cleaner mechanism.
Figure 8:
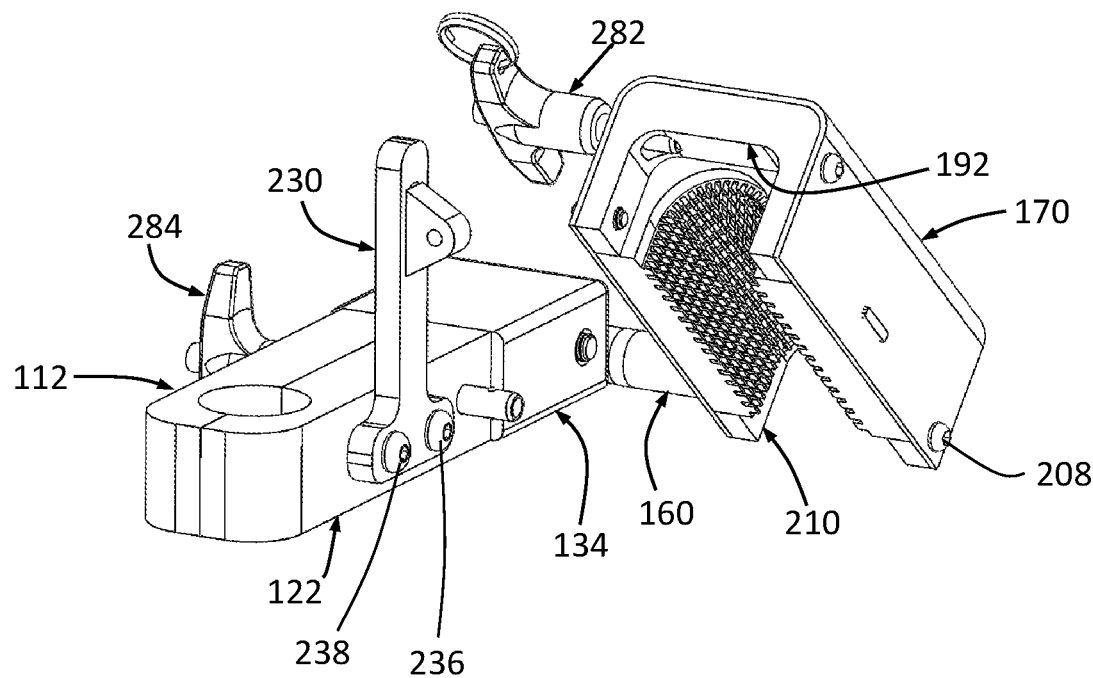
FIG. 8 depicts an anterior perspective view of the tire cleaner mechanism of FIG. 7.

As illustrated in FIG. 6-11, the tire cleaner assembly 108 comprises a first frame clamp 110, a quick release block 134, a first link 150, a first pivot spacer 160, and a cleaner housing 168 as depicted in at least FIG. 6. In this embodiment, the first frame clamp 110 comprises a medially placed first clamp body 112 adjacent a laterally placed second clamp body 122. Extending substantially vertical through an anterior end of the first frame clamp 110 is a first frame aperture 113 defined by opposing first clamp face 114 and second clamp face 124. Here, although not required, the first clamp body 112 and second clamp body 122 are substantially identical being generally elongate and having an exterior face 117 and an interior face 119. At a posterior end, a first mate channel 118 is recessed in the first clamp body 112 and a second mate channel 128 is recessed in the second clamp body 122 together defining a mate receiver 132 for receiving a mate boss 136 of quick release block 134. Extending between the first clamp body 112 and second clamp body 122 are one or more first fastening holes 116 aligned with second fastening holes 126. In preferred embodiments, at least some of the holes are threaded whereby one or more of a first fixator 236 and a second fixator 238 are advanced in the holes to clamp the first clamp body 112 and second clamp body 122 together thereby fixing the first frame clamp 110 to second wheelchair frame 109.

Figure 9:
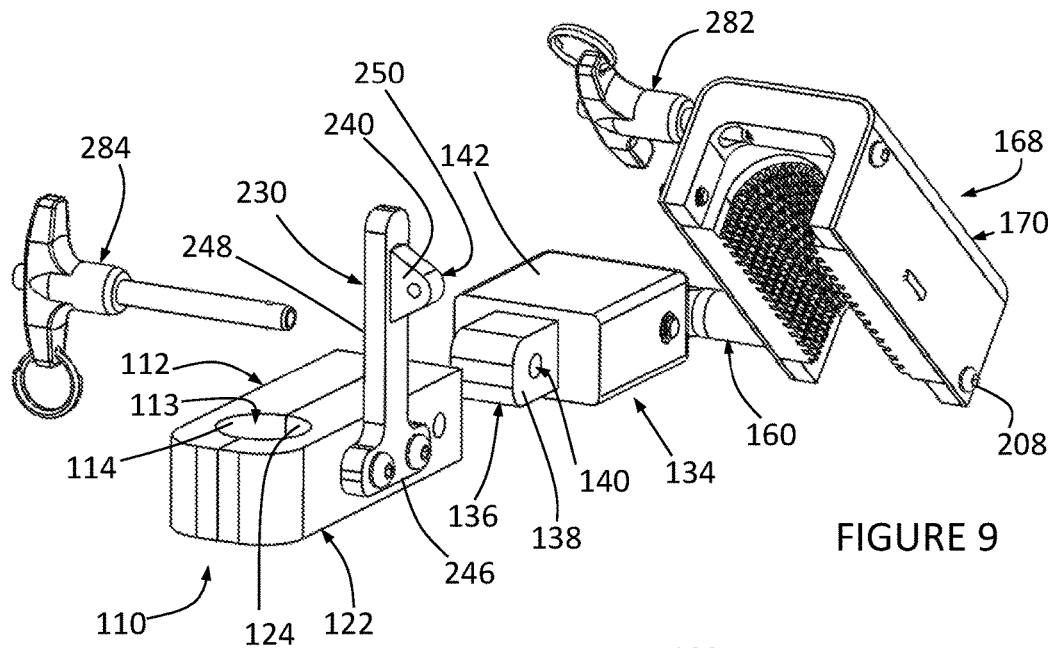
FIG. 9 depicts an anterior partially exploded perspective view of the tire cleaner mechanism of FIG. 7.
Figure 11:
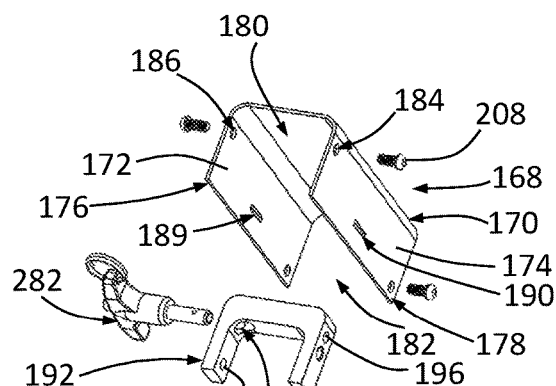
FIG. 11 depicts an exploded perspective view of the tire cleaner mechanism of FIG. 7.

As illustrated in FIGS. 9 and 11, first fixator 236 and second fixator 238 can first be advanced through first post fixation hole 232 and second post fixation hole 234 of activation post 230. In alternative forms, other methods such as welding may be used to fix activation post 230 to second clamp body 122.

Figure 13:
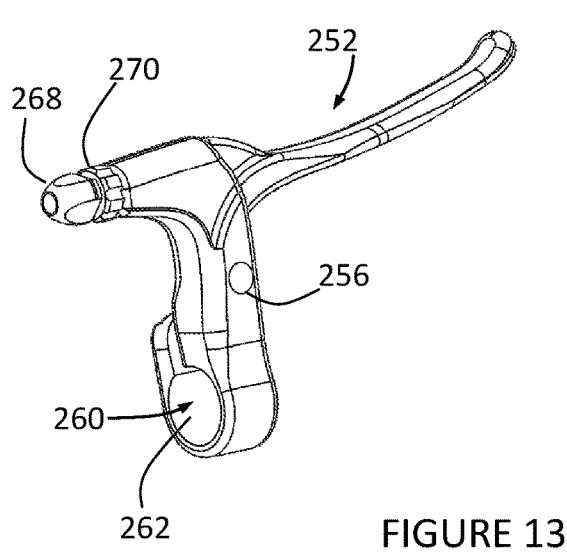
FIG. 13 depicts a perspective view of an activation handle.
Figure 14:
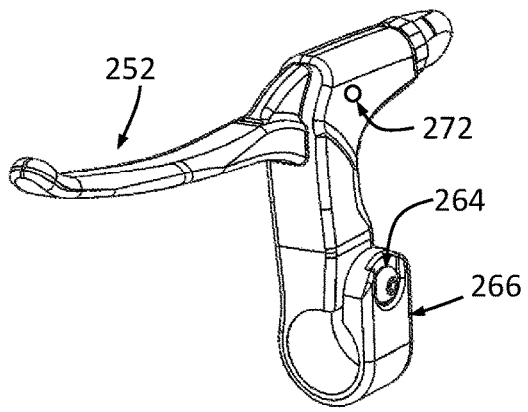
FIG. 14 depicts a perspective view from the opposite side of the activation handle of FIG. 13.

In this embodiment, activation post 230 comprises a first leg 246 having a length sufficient to support the first post fixation hole 232 and second post fixation hole 234. Extending upwards from first leg 246 is second leg 248 with laterally protruding nose 250. On an anterior facing surface of nose 250 is stop face 240, whereas on a posterior facing surface of nose 250 is spring face 242. Activation bypass hole 244 extends between spring face 242 and stop face 240. As will be described in latter paragraphs, the activation bypass hole 244 houses activation cable 274 of activation assembly 106 illustrated in FIGS. 12-14.

Figure 10:
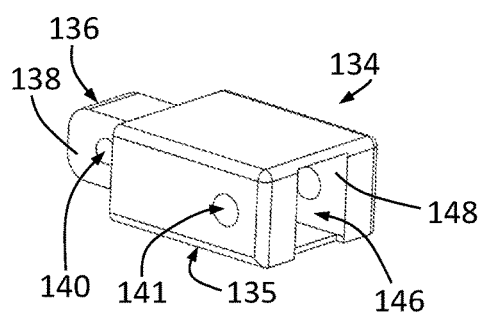
FIG. 10 depicts a perspective view of a quick release block used in the tire cleaner mechanism of FIG. 7.

As noted in FIG. 10, quick release block 134 comprises a quick release body 135 that in this embodiment is substantially rectangular having an outer surface 142. Protruding from an anterior end is mate boss 136 that is sized and shaped for housing within mate receiver 132 of first frame clamp 110. Mate boss 136, here substantially in the form of a rounded cuboid, is defined by mate boss surface 138 with mate boss hole 140 extending horizontally across the mate boss 136. Mate boss hole 140 is sized to receive cleaner removal pin 284. When mate boss 136 is seated in mate receiver 132, they remain releasably fixed to each other when cleaner removal pin 284 extends through first pin hole 120, second pin hole 130 and mate boss hole 140.

Recessed in an opposing end of quick release block 134 is link housing 146. Horizontally extending across a posterior end of the quick release block 134 through link housing 146 is release block hole 141. Link housing 146 is defined by link housing surface 148 which is sized and shaped for pivotably receiving an anterior end of first link 150 which is defined by a first pivot channel 152 at an anterior end. First link 150 includes a second pivot channel 156 at the posterior end. First pivot channel 152 is defined by first pivot surface 154 and second pivot channel 156 is defined by second pivot surface 158, whereby each of these channels are parallel and extending horizontally from medial to lateral. In an assembled configuration, first link fastener 149 resides in release block hole 141 and in first pivot channel 152. A second link fastener 151 resides in second pivot channel 156 of first link 150 and in the elongate pivot spacer hole 162 that extends between a pivot spacer first end 164 and a pivot spacer second end 166 of first pivot spacer 160. Second link fastener 151 terminates in a threaded fixation hole of a substantially U-shaped first housing support 192 that is part of cleaner housing 168. In this embodiment, cleaner housing 168 comprises a housing body 170 that is substantially in the form of a U-shaped tunnel. The inside of the housing body is defined by inner housing surface 172 whereas the outside of the housing body is defined by outer housing surface 174. Anteriorly is first housing end 176 of the housing body 170 having a first engagement window 180 leading into the U-shaped body, whereas posteriorly is second housing end 178 of the housing body 170 and having a second engagement window 182 leading into the U-shaped body. Extending through housing body 170 between outer housing surface 170 and inner housing surface 172 are a plurality of fixation apertures 184. Also extending through the housing body are one or more retainer windows such as first retainer window 189 and second retainer window 190. These retainer windows are sized and shaped for housing of a retension boss such as depicted in FIG. 11 where cleaner body 214 comprises a first retension boss 226 and a second retension boss 228. Upon insertion or removal of cleaner body 214 within housing body 170, the retension bosses engage or disengage from the corresponding first retainer window 189 and second retainer window 190 thereby inserting or releasing the cleaner body 214 from the housing body 170.

Cleaner housing 168 is reinforced by U-shaped first housing support 192 and second housing support 210. The first housing support 192 comprises one or more fixation holes 196 which can be threaded for engagement with housing fixation screw 208 thereby securing the first housing support 192 and second housing support 210 to housing body 170. The first and second housing supports are spaced to be at the first housing end 176 and second housing end 178. Seated therebetween adjacent inner housing surface 172 is cleaner body 214 having a first cleaner end 222 on one end and a second cleaner end 224 on the other. In this embodiment, cleaner body 214 comprises an outer cleaner surface 218 having a profile for seating in the housing body, and an inner cleaner surface 220 having a profile to complement a wheelchair tire such as the arch profile depicted. Extending from the inner cleaner surface is a plurality of cleaner bristles 216 distributed for tire contact when in the engaged configuration.

At the anterior end of cleaner housing 168 is a release pin aperture 186 extending laterally through the housing body 170 and aligned with release pin hole 194 extending horizontally from a medial side of first housing support 192. The release pin aperture 186 and release pin hole 194 are sized for releasable seating of activation release pin 282 therein.

Figure 12:
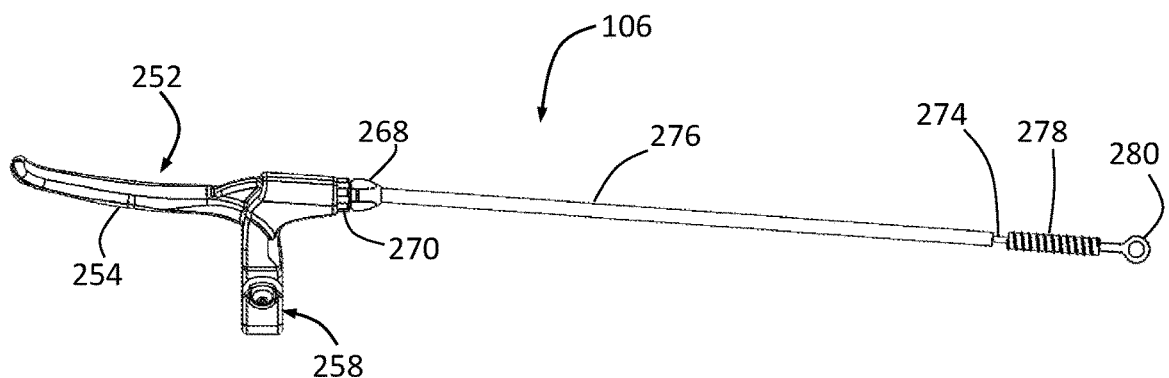
FIG. 12 depicts a perspective view of an activation assembly.

FIG. 12 depicts an embodiment of an activation assembly. It comprises an activation handle 252 having a cantilevered handle body 254 that is pivotably captured about pivot pin 256 within a clamp body 258. Clamp body 258 comprises a second frame aperture 260 defined by third clamp face 262. The second frame aperture is sized and shaped for clamping on a first wheelchair frame 107 which in this embodiment has a cylindrical profile. The clamp body 258 comprises a deflector arm 266 which tightens about the second frame aperture 260 when clamp fastener 264 is advanced. Seated with threads in a posterior end of clamp body 258 is slack bolt 268 with slack bolt lock 270 threaded about its neck. The slack bolt 268 can be rotated to remove slack in cable sheath 276 then locked into position with slack bolt lock 270. Gliding within cable sheath 276 is activation cable 274 which on one end is connected to activation handle 252. The opposing end of activation cable 274 terminates in an end capture 280 which in this embodiment is in the form of a cylindrical hoop for pivotal fixation about the shaft of activation release pin 282. A bias element 278, here in the form of a spring encircles activation cable 274 at a posterior end just before end capture 280.

Upon assembly, clamp body 258 is clamped on a first wheelchair frame 107 within second frame aperture 260. Activation cable 274 extends through activation bypass hole 244 of activation post 230. The activation bypass hole 244 may be open slotted for eased removal of the cable from the bypass hole. The posterior end of cable sheath 276 abuts stop face 240 of nose 250. Bias element 278 is seated between spring face 242 and end capture 280 thereby causing consequent upward movement of the tire cleaning assembly 108 into the disengaged position when activation handle 252 is released. Alternatively, bias element 278 is compressed when activation handle 252 is depressed causing consequent engagement of the cleaner bristles 216 against the wheelchair tire 105 thereby brushing off dirt and debris when the wheelchair is moved forward. In some embodiments, the user can temporarily activate a provisional lock 272 on activation assembly 106 in effect keeping the activation handle 252 depressed. This feature provides a method for a user to activate the tire cleaner assembly 108 and then simultaneously propel their wheelchair forward such as from their own hand force on propulsion ring 111. Releasing the provisional lock 272 causes consequent movement into the disengaged configuration.

Removal of the tire cleaner assembly 108 is accomplished by removing activation release pin 282 to disassociate end capture 280 therefrom. The cleaner removal pin 284 is also removed thereby causing freeing of the tire cleaner assembly 108 for removal. By reversing these steps, the tire cleaner assembly 108 can be reassembled.

FIGS. 15-24 provide various views of yet another embodiment of a tire cleaner mechanism 104B with FIGS. 15-18 depicting the mechanism mounted to a wheelchair 102B and thus depicted in the drawings as wheelchair with tire cleaner mechanism 100B.

Figure 15:
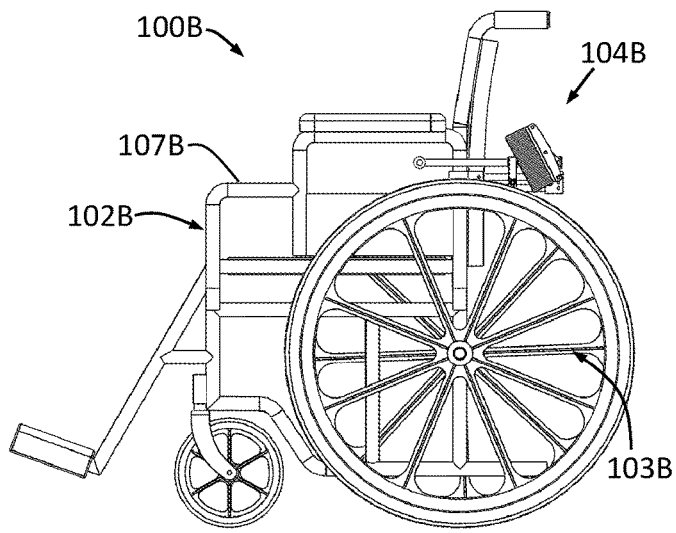
FIG. 15 depicts a side view of a wheelchair with tire cleaner mechanism disengaged.
Figure 16:
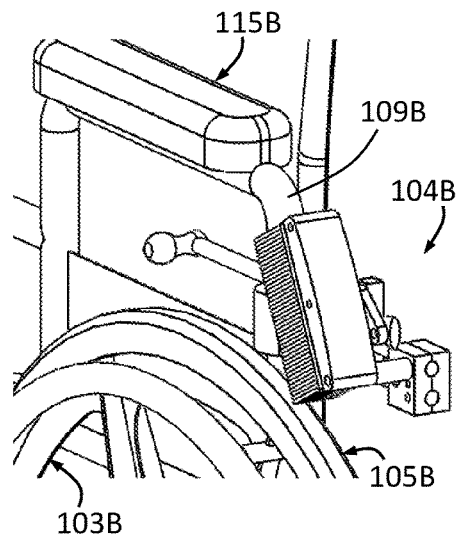
FIG. 16 depicts a posterior partial perspective view of the wheelchair with tire cleaner mechanism disengaged.
Figure 17:
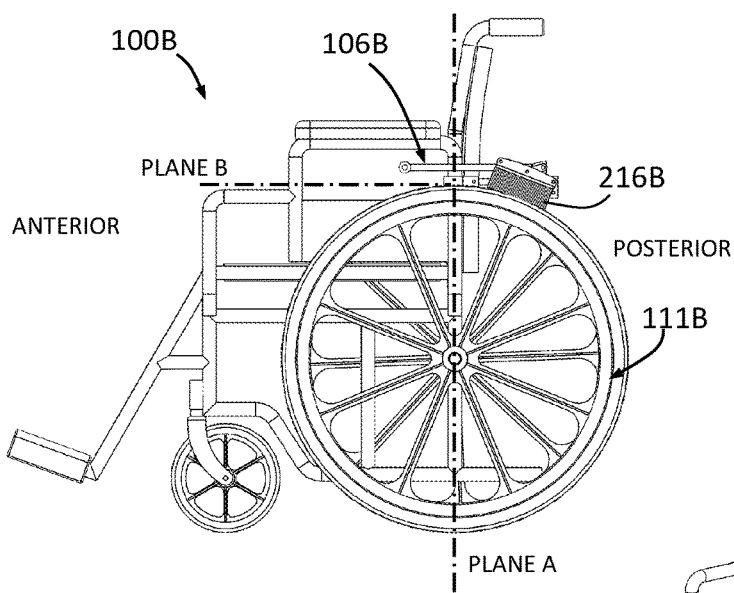
FIG. 17 depicts a side view of a wheelchair with tire cleaner mechanism engaged.
Figure 18:
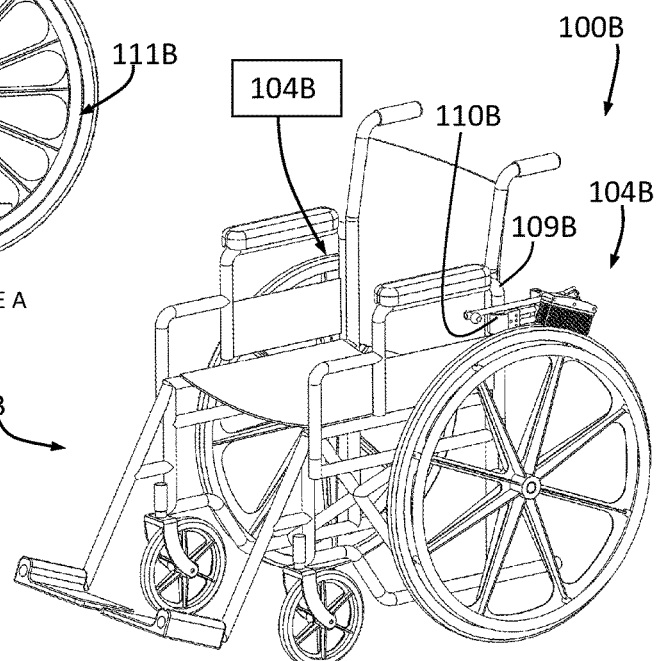
FIG. 18 depicts an anterior perspective view of a wheelchair with a tire cleaner mechanism and also illustrating that the tire cleaner mechanism can be utilized bilaterally.

The tire cleaning mechanism 104B comprises an activation assembly 106B which activates and deactivates the device, a fixation portion 121B which secures the tire cleaning mechanism to a wheelchair frame, and a tire cleaner assembly 108B for cleaning the surface of a wheelchair tire. FIG. 15-16 illustrates the tire cleaner mechanism mounted to the frame of a wheelchair in a disengaged configuration as evidenced by the bristles 216B the cleaner body 214B being spaced from the wheelchair tire. FIGS. 17-18 depict the tire cleaner mechanism 104B in an engaged configuration as evidenced by the bristles of the cleaner body 214B abutting the wheelchair tire 105B. As pointed out in FIG. 18, the tire cleaner mechanism can, and in most cases is mounted bilaterally.

Figure 20:
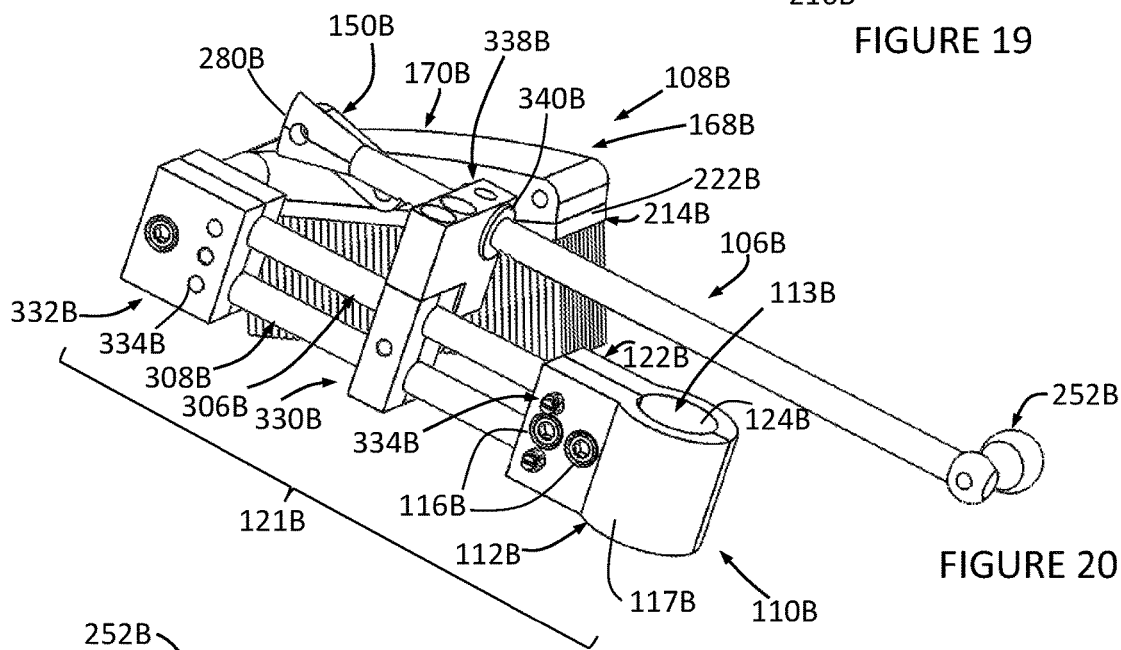
FIG. 20 is an opposing side view of the tire cleaner mechanism for a wheelchair of FIG. 19.

As noted in FIG. 20, a fixation portion 121B of a tire cleaning mechanism 104B comprises a first frame clamp 110B spaced from a mid-rod clamp 330B which in turn is spaced from a terminal rod clamp 332B. The first frame clamp 110B comprises a first clamp body 112B and an opposed second clamp body 122B. The first clamp body 112B has a first clamp face 114B, whereas the second clamp body 122B has a second clamp face 124B. The first clamp body 112B and second clamp body 122B are held together by a first fixator 236B and a second fixator 238B whereas in some forms the first fixator 236B and second fixator 238B are threaded fasteners as illustrated here. As further noted in FIG. 20, first clamp face 114B and second clamp face 124B define a first clamp aperture 113B operable for clamping over a portion of a wheelchair frame as illustrated in FIG. 18. Extending substantially perpendicular from the first frame aperture 113B is one or more first mate channels 118B for seating of a rod. A pair of first fastening holes 116B extend through the first clamp body 112B and second clamp body 122B and are occupied by fixators such as threaded fasteners here shown as first fixator 236B and second fixator 238B.

An upper rod 306B and a lower rod 308B extend from the first frame clamp 110B, through the mid-rod clamp 330B, to the terminal rod clamp 332B. The upper rod and the lower rods have an anterior end facing the front of a wheelchair and a posterior end facing the back of a wheelchair. The upper rod 306B and/or the lower rod 308B have one or more radial indents 360B operable for selective positional fixation within one or more of the first frame clamp 110B, mid-rod clamp 330B, and terminal rod clamp 332B by a rod lock screw 334B extending through the respective clamps.

The mid-rod clamp 330B comprises a third clamp body 310B and an opposed fourth clamp body 314B. An opposing third mate channel 352B and fourth mate channel 354B extends though the mid-rod clamp 330B for housing a portion of the upper rod 306B and lower rod 308B therein. A third fixator 318B clamps together the third clamp body 310B and fourth clamp body 314B. A terminal rod clamp 332B comprises a fifth clamp body 312B mated to an opposed sixth clamp body 316B. An opposing fifth mate channel 356B and sixth mate channel 358B extends through the terminal rod clamp 332B for housing a portion of the upper rod 306B and lower rod 308B. One or more of a fourth fixator 320B and fifth fixator 322B clamps the fifth clamp body 312B to the sixth clamp body 316B. The first frame clamp 110B, the mid-rod clamp 330B, and the terminal rod clamp 332B can be adjustably clamped along the upper rod 306B and lower rod 308B as needed to facilitate correct positioning of the tire cleaner assembly on varying sizes and types of wheelchairs.

Figure 23:
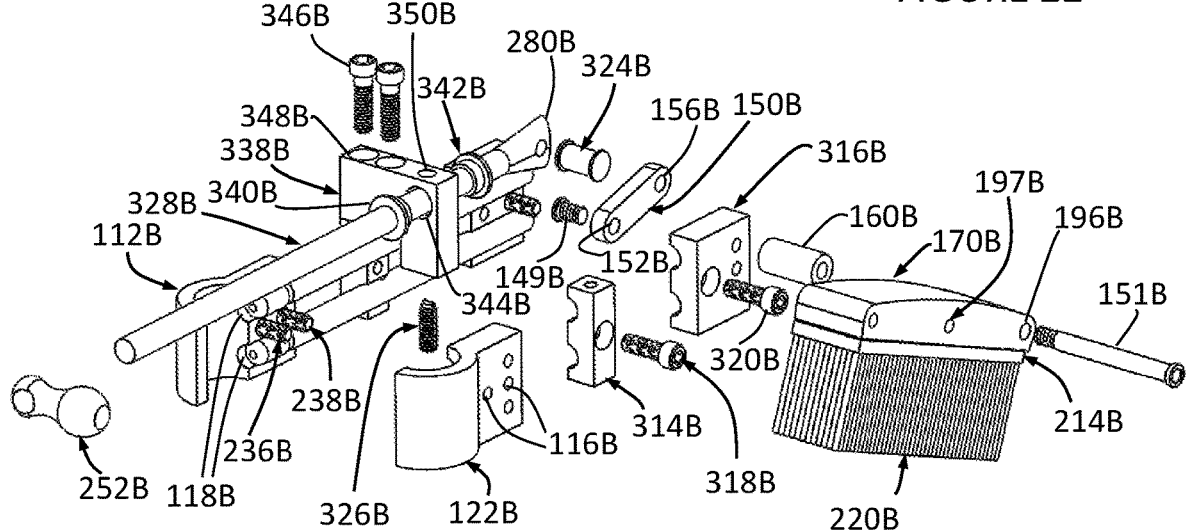
FIG. 23 is an exploded perspective view of the tire cleaner mechanism for a wheelchair of FIG. 19.
Figure 24:
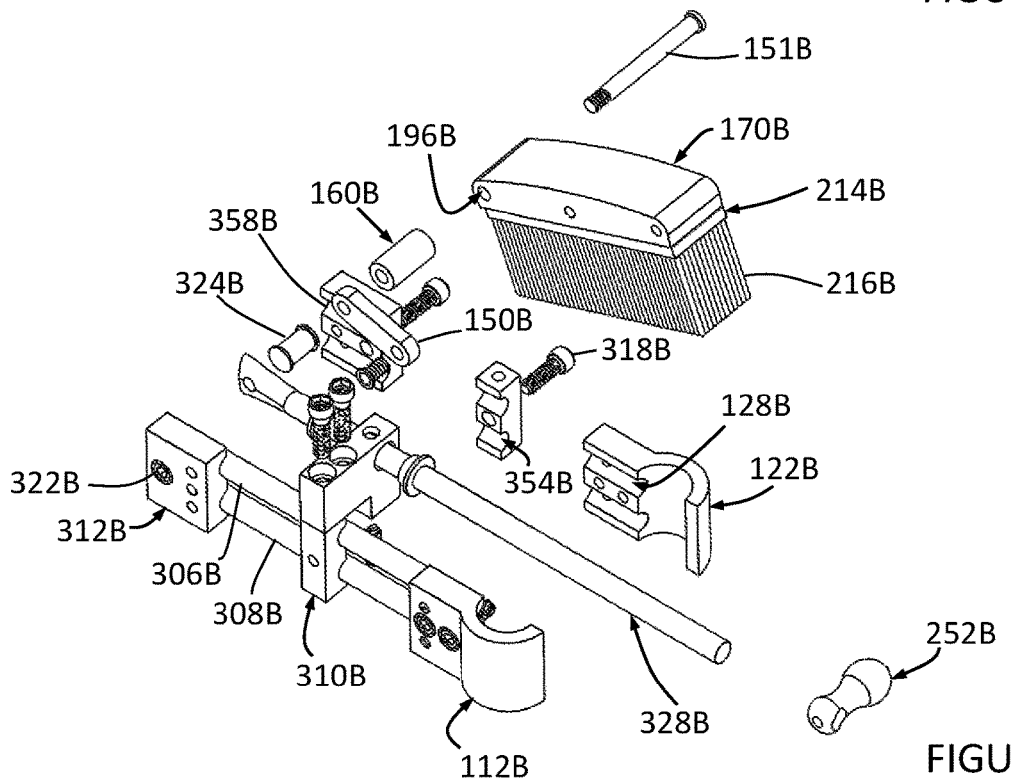
FIG. 24 is an opposing exploded perspective view of the tire cleaner mechanism for a wheelchair of FIG. 23.

As illustrated in at least FIGS. 20 and 23, an activator housing 338B extends upward from the mid-rod clamp 330B. The activator housing 338B is fixated to the mid-rod clamp 330B through one or more housing fasteners 346B extending through housing fastener holes 348B. The activator housing 338B comprises a guide aperture 344B operable for housing an activation rod 328B. The guide aperture 344B is substantially parallel in this embodiment to the upper rod 306B and lower rod 308B. A first guide 340B and a second guide 342B in the form of bushings are seated in opposing sides of the guide aperture.

An activation rod 328B comprises an enlarged activation handle 252B mounted thereon and extending from an anterior end of the activation rod. The activation handle is formed to provide low effort application of forces on the activation rod 328B. As noted in FIG. 22, the activation rod comprises a plurality of rod teeth 336B extending substantially linearly along the activation rod. At a posterior end, an activation rod 328B comprises a posteriorly placed end capture 280B operable for housing an activation pin 324B within the hole through the end capture.

In FIG. 23, note the activator housing 338B comprises a spring pin recess 350B extending through the activator housing 338B and through guide aperture 344B and operable for seating a spring pin 326B therein whereby the spring pin is in contact with rod teeth 336B on the the activation rod 328B. The interaction between the spring pin 326B and rod teeth 336B causes a consequent position hold of the activation rod when forces on the activation rod are removed. An activation handle 252B is disposed on an anterior end of the activation rod 328B for grasping by a wheelchair user or assistant to engage and disengage the tire cleaner assembly 108B on the wheelchair tire 105B. In this manner, the tire cleaning mechanism will remain in whichever engaged or disengaged configuration last applied when the user released the activation handle.

Figure 19:
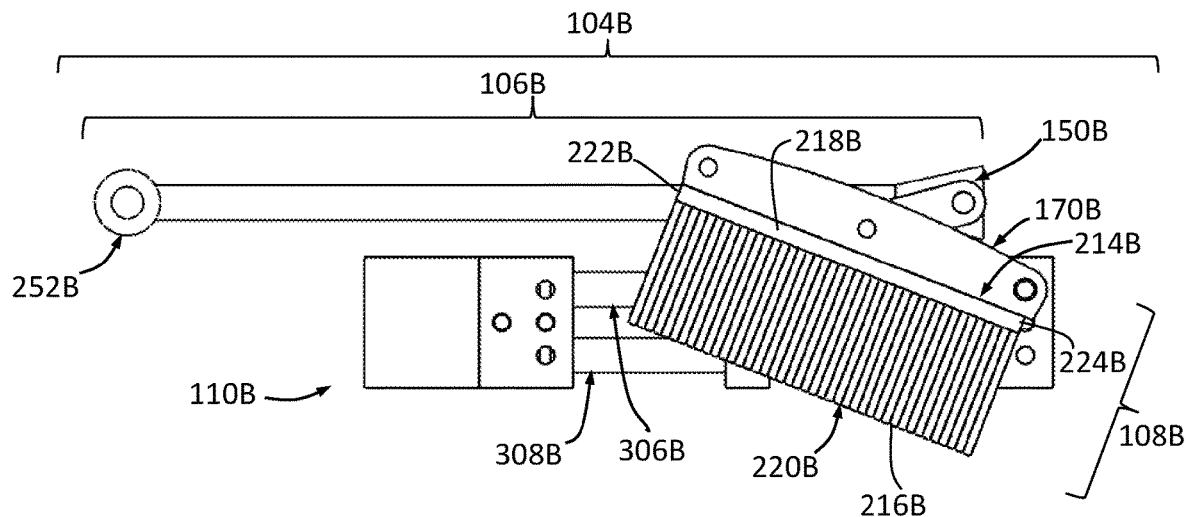
FIG. 19 is a side view of a tire cleaner mechanism for a wheelchair.
Figure 21:
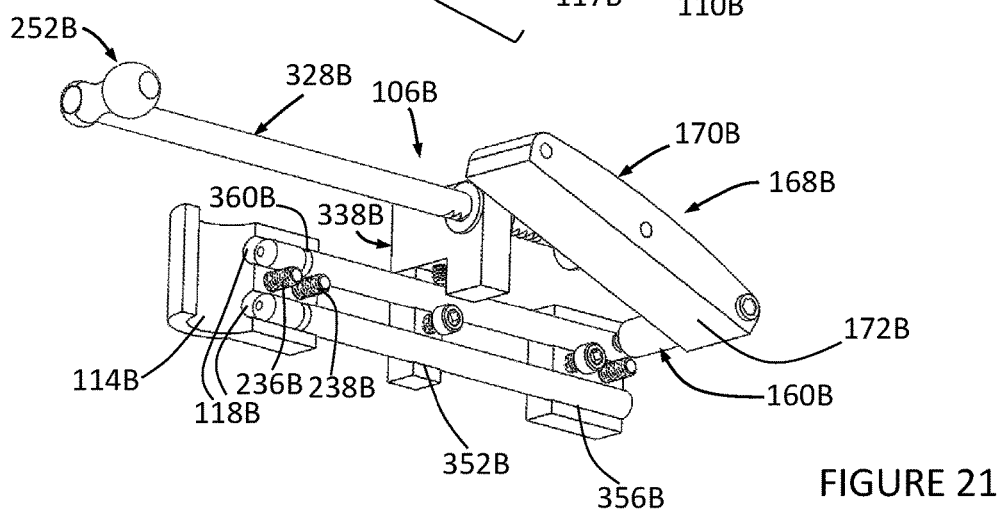
FIG. 21 is an inferior side view with portions removed for improved viewing of the tire cleaner mechanism of FIG. 19.
Figure 22:
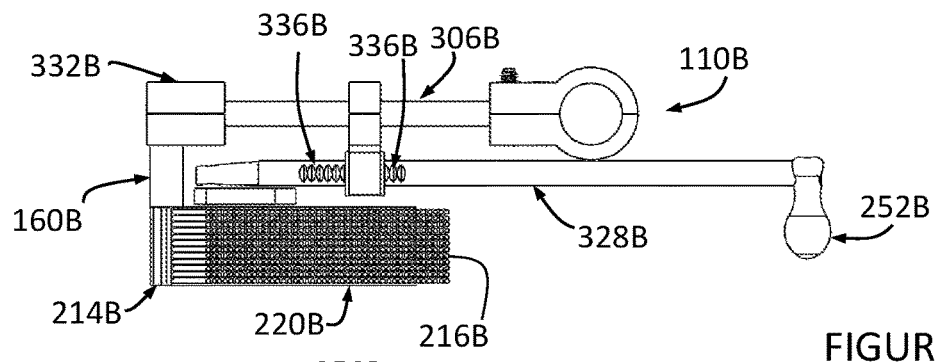
FIG. 22 is an inferior view of the tire cleaner mechanism for the wheelchair of FIG. 19.

As noted in FIGS. 19, 21 and other Figures, tire cleaner assembly 108B comprises a cleaner housing 168B formed from a housing body 170B whereby the cleaner housing 168B is operable to secure a cleaner body 214B thereto. In this embodiment, the cleaner housing is a relatively flat structure (like the rigid part of a scrub brush) whereas in a previous embodiment the cleaner housing was substantially U-shaped. As noted in FIG. 19-20, cleaner body 214B comprises a plurality of cleaner bristles 216B extending from one side of the cleaner body and has a first cleaner end 222B and opposed second cleaner end 224B. An outer cleaner surface 218B of cleaner body 214B is fixed or releasably fixed to a downward facing or other inner housing surface 172B of the housing body 170B. Fasteners, adhesives, or other methods known in the art can be used here. A fixation hole 196B (FIG. 23) extends through the posterior end of the housing body 170B which houses a second link fastener 151B and whereas the end of the second link fastener is secured within the terminal rod clamp 332B. A first pivot spacer 160B is utilized in this embodiment between the terminal rod clamp 332B and cleaner housing body 170B.

A first link 150B is coupled at a second pivot channel 156B to the end capture 280B of activation rod 328B, and coupled at a first pivot channel 152B to the cleaner housing body 170B at mid fixation hole 197B. An activation pin 324B couples the end capture 280B of the activation rod 328B to the second pivot channel 156B of first link 150B. A first link fastener 149B couples a first link 150B to the cleaner housing body 170B at mid fixation hole 197B. The activation rod 328B has an enlarged activation handle 252B fixed at one end. Translation of the activation rod causes consequent movement of the first link 150B, which in turn causes the cleaner body 214B to engage or disengage a tire 105B on a wheelchair 102B thereby wiping debris from the wheelchair tire when engaged while the wheelchair moves in a forward or reverse direction. In alternative embodiments, the inner cleaner surface 220B can be contoured to other shapes besides flat to complement the contour of the wheelchair tire.

It is noted that the terms "substantially" and "about" and "generally" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

The foregoing invention has been described in accordance with the relevant legal standards, thus the description is exemplary rather than limiting in nature. Variations and modifications to the disclosed embodiment may become apparent to those skilled in the art and fall within the scope of the invention.

The invention claimed is:

1. A tire cleaning mechanism for a wheelchair comprising:
   a fixation portion;
   a tire cleaner assembly;
   an activation assembly;
   said fixation portion operable to fixate said tire cleaner assembly to a wheelchair frame;
   said tire cleaner assembly operable to remove debris from a wheelchair tire;
   said activation assembly operable to move said tire cleaner assembly between an engaged configuration whereby a portion of said tire cleaner assembly engages a wheelchair tire and a disengaged configuration whereby the tire cleaner assembly is substantially removed from the wheelchair tire; and
   wherein said tire cleaner assembly is pivotably connected between said fixation portion and said activation assembly.

2. The tire cleaning mechanism for a wheelchair of claim 1 whereas said fixation portion further comprises:
   a first frame clamp;
   said first frame clamp comprising a first clamp body with a first clamp face formed thereon;
   said first frame clamp comprising a second clamp body with a second clamp face formed thereon;
   said first clamp body and said second clamp body opposed in an operable configuration whereby said first clamp face and said second clamp face are opposed and define a first frame aperture operable for clamping a portion of a wheelchair frame therein.

3. The tire cleaning mechanism for a wheelchair of claim 1 whereas said fixation portion further comprises:
   a first frame clamp operable for clamping a portion of a wheelchair frame therein; and,
   a quick release block releasably coupled to said first frame clamp operable for removal of said tire cleaning assembly from coupling with said first frame clamp.

4. The tire cleaning mechanism for a wheelchair of claim 3 whereby said tire cleaner assembly is coupled to said quick release block of said fixation portion.

5. The tire cleaning mechanism for a wheelchair of claim 3 further comprising:
   a first link:
   whereby said first link pivotably couples said tire cleaner assembly to said quick release block.

6. The tire cleaning mechanism for a wheelchair of claim 1 whereby said activation assembly further comprises an activation cable.

7. The tire cleaning mechanism for a wheelchair of claim 1 further comprises:
   an activation handle;
   a pivot pin;
   whereas said activation handle pivots about said pivot pin.

8. The tire cleaning mechanism for a wheelchair of claim 1 further comprising:
   a bias element;
   whereby said bias element biases said tire cleaner assembly toward a disengaged configuration.

9. The tire cleaning mechanism for a wheelchair of claim 1 further comprising:
   a cleaner body;
   whereas said cleaner body is operable for mounting posterior to the superior crest of a wheelchair tire.

10. The tire cleaning mechanism for a wheelchair of claim 1 further comprising:
a cleaner body;
whereby moving said cleaner body to an engaged configuration involves pivoting a first cleaner end of said cleaner body toward a wheelchair tire when said tire cleaning mechanism is in an operable configuration.

11. The tire cleaning mechanism for a wheelchair of claim 1 whereas said fixation portion further comprises:
a first frame clamp;
a terminal rod clamp;
a first rod;
said terminal rod clamp spaced posterior to said first frame clamp in an operable configuration; and
said first rod extending between said terminal rod clamp and said first frame clamp.

12. The tire cleaning mechanism for a wheelchair of claim 11 further comprising:
a mid-rod clamp;
said first rod extending through said mid-rod clamp.

13. The tire cleaning mechanism for a wheelchair of claim 12 whereby said mid-rod clamp is positionally adjustable along said first rod.

14. The tire cleaning mechanism for a wheelchair of claim 12 further comprising:
an activator housing;
said activation assembly comprising an activation rod;
said activator housing extending from said mid-rod clamp;
said activator housing comprising a guide aperture; and
whereas said guide aperture houses a portion of said activation rod.

15. The tire cleaning mechanism for a wheelchair of claim 14 further comprising:
rod teeth;
a spring pin;
said rod teeth formed on said activation rod;
whereas said spring pin engages said rod teeth as said activation rod is translated.

16. The tire cleaning mechanism for a wheelchair of claim 1 further comprising:
a first link;
said activation assembly comprising an activation rod;
said activation rod comprising an end capture located at a posterior end of said activation rod operable for pivotal coupling with said first link;
said first link pivotably coupled to said tire cleaner assembly; and
whereby translation of said activation rod causes consequent movement of said tire cleaner assembly between said engaged configuration and said disengaged configuration when used in an operable configuration.

17. The tire cleaning mechanism for a wheelchair of claim 1 whereas said tire cleaner assembly further comprises:
a cleaner housing;
a cleaner body;
whereas said cleaner housing is operable to secure a cleaner body; and
whereas said cleaner body comprises cleaner bristles extending from said cleaner body.

18. The tire cleaning mechanism for a wheelchair of claim 1 further comprising:
an activation handle operable for receiving forces to activate said tire cleaner assembly between said engaged configuration and said disengaged configuration; and
whereas said activation handle is positioned superior said wheelchair tire and anterior the superior crest of the wheelchair tire in an operable configuration.

19. The tire cleaning mechanism for a wheelchair of claim 1 whereas said fixation portion further comprises:
a first frame clamp;
a mid-rod clamp;
a terminal rod clamp;
a first rod;
said terminal rod clamp spaced posterior to said first frame clamp in an operable configuration;
said mid-rod clamp positioned between said terminal rod clamp and said first frame clamp; and
whereas said first rod extends through said mid-rod clamp and terminates in said first frame clamp and said terminal rod clamp.

20. The tire cleaning mechanism for a wheelchair of claim 1 further comprising:
a first pivot spacer;
a cleaner body;
whereas said first pivot spacer spaces said cleaner body from said fixation portion whereas said cleaner body is aligned over a wheelchair tire in an operable configuration.

* * * * *